(12) United States Patent
Lucas et al.

(10) Patent No.: US 7,159,099 B2
(45) Date of Patent: Jan. 2, 2007

(54) STREAMING VECTOR PROCESSOR WITH RECONFIGURABLE INTERCONNECTION SWITCH

(75) Inventors: Brian Geoffrey Lucas, Barrington, IL (US); Philip E. May, Palatine, IL (US); Kent Donald Moat, Winfield, IL (US); Raymond B. Essick, IV, Glen Ellyn, IL (US); Silviu Chiricescu, Chicago, IL (US); James M. Norris, Naperville, IL (US); Michael Allen Schuette, Wilmette, IL (US); Ali Saidi, Cambridge, MA (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 10/184,583

(22) Filed: Jun. 28, 2002

(65) Prior Publication Data
US 2004/0003206 A1 Jan. 1, 2004

(51) Int. Cl.
*G06F 15/00* (2006.01)
(52) U.S. Cl. .............. 712/218; 712/2; 712/15; 712/37; 712/43; 712/229; 712/245
(58) Field of Classification Search .......... 712/218, 712/2–9, 15, 37, 43, 245, 229; 717/144
See application file for complete search history.

(56) References Cited

U.S. PATENT DOCUMENTS

| | | | |
|---|---|---|---|
| 3,718,912 A | 2/1973 | Hasbrouck et al. | |
| 4,128,880 A | 12/1978 | Cray, Jr. | |
| 4,744,043 A * | 5/1988 | Kloker | 708/490 |
| 4,760,545 A | 7/1988 | Inagami et al. | |
| 4,807,183 A | 2/1989 | Kung et al. | |
| 4,825,361 A | 4/1989 | Omoda et al. | |
| 4,918,600 A | 4/1990 | Harper, III et al. | |
| 5,206,822 A | 4/1993 | Taylor | |
| 5,317,734 A | 5/1994 | Gupta | |
| 5,367,494 A | 11/1994 | Shebanow et al. | |
| 5,390,352 A | 2/1995 | Kinoshita | |
| 5,418,953 A | 5/1995 | Hunt et al. | |
| 5,423,040 A | 6/1995 | Epstein et al. | |
| 5,450,607 A * | 9/1995 | Kowalczyk et al. | 712/41 |

(Continued)

OTHER PUBLICATIONS

Al-Mouhamed, M., "Lower Bound on the Number of Processors and Time for Scheduling Precedence Graphs with Communication Costs", IEEE, Dec. 1990.

(Continued)

*Primary Examiner*—Fritz Fleming
*Assistant Examiner*—Tonia L. Meonske

(57) ABSTRACT

A re-configurable, streaming vector processor (100) is provided which includes a number of function units (102), each having one or more inputs for receiving data values and an output for providing a data value, a re-configurable interconnection switch (104) and a micro-sequencer (118). The re-configurable interconnection switch (104) includes one or more links, each link operable to couple an output of a function unit (102) to an input of a function unit (102) as directed by the micro-sequencer (118). The vector processor may also include one or more input-stream units (122) for retrieving data from memory. Each input-stream unit is directed by a host processor and has a defined interface (116) to the host processor. The vector processor also includes one or more output-stream units (124) for writing data to memory or to the host processor. The defined interface of the input-stream and output-stream units forms a first part of the programming model. The instructions stored in a memory, in the sequence that direct the re-configurable interconnection switch, form a second part of the programming model.

20 Claims, 3 Drawing Sheets

U.S. PATENT DOCUMENTS

| | | | |
|---|---|---|---|
| 5,495,617 A | | 2/1996 | Yamada |
| 5,652,909 A | | 7/1997 | Kodosky |
| 5,697,788 A | * | 12/1997 | Ohta .......................... 434/118 |
| 5,717,947 A | | 2/1998 | Gallup et al. |
| 5,719,988 A | * | 2/1998 | Ku et al. .................... 704/500 |
| 5,734,863 A | | 3/1998 | Kodosky et al. |
| 5,742,821 A | | 4/1998 | Prasanna |
| 5,764,787 A | | 6/1998 | Nickerson |
| 5,790,877 A | | 8/1998 | Nishiyama et al. |
| 5,805,614 A | | 9/1998 | Norris |
| 5,821,934 A | | 10/1998 | Kodosky et al. |
| 5,826,080 A | | 10/1998 | Dworzecki |
| 5,881,257 A | | 3/1999 | Glass et al. |
| 5,881,263 A | | 3/1999 | York et al. |
| 5,887,183 A | | 3/1999 | Agarwal et al. |
| 5,893,143 A | | 4/1999 | Tanaka et al. |
| 5,936,953 A | | 8/1999 | Simmons |
| 5,966,528 A | | 10/1999 | Wilkinson et al. |
| 5,969,975 A | | 10/1999 | Glass et al. |
| 5,999,736 A | | 12/1999 | Gupta et al. |
| 6,052,766 A | | 4/2000 | Betker et al. |
| 6,064,819 A | | 5/2000 | Franssen et al. |
| 6,104,962 A | | 8/2000 | Sastry |
| 6,112,023 A | | 8/2000 | Dave et al. |
| 6,128,775 A | | 10/2000 | Chow et al. |
| 6,173,389 B1 | | 1/2001 | Pechanek et al. |
| 6,192,384 B1 | | 2/2001 | Dally et al. |
| 6,202,130 B1 | * | 3/2001 | Scales et al. ............... 711/137 |
| 6,253,372 B1 | | 6/2001 | Komatsu et al. |
| 6,370,560 B1 | | 4/2002 | Robertazzi et al. |
| 6,381,687 B1 | | 4/2002 | Sandstrom et al. |
| 6,430,671 B1 | | 8/2002 | Smith |
| 6,437,804 B1 | | 8/2002 | Ibe et al. |
| 6,442,701 B1 | | 8/2002 | Hurd |
| 6,490,612 B1 | | 12/2002 | Jones et al. |
| 6,513,107 B1 | | 1/2003 | Ansari |
| 6,571,016 B1 | | 5/2003 | Mehrotra et al. |
| 6,588,009 B1 | | 7/2003 | Guffens et al. |
| 6,598,221 B1 | * | 7/2003 | Pegatoquet et al. ......... 717/152 |
| 6,629,123 B1 | | 9/2003 | Hunt |
| 6,647,546 B1 | | 11/2003 | Hinker et al. |
| 6,665,749 B1 | | 12/2003 | Ansari |
| 6,732,354 B1 | | 5/2004 | Ebeling et al. |
| 6,745,160 B1 | | 6/2004 | Ashar et al. |
| 6,792,445 B1 | | 9/2004 | Jones et al. |
| 7,000,232 B1 | | 2/2006 | Jones et al. |
| 7,010,788 B1 | | 3/2006 | Rehg et al. |
| 2002/0080795 A1 | | 6/2002 | Van Wageningen et al. |
| 2002/0112228 A1 | | 8/2002 | Granston et al. |
| 2002/0120923 A1 | | 8/2002 | Granston et al. |
| 2003/0128712 A1 | | 7/2003 | Moriwaki et al. |

OTHER PUBLICATIONS

Samadzadeh, F. et al., "A Heuristic Multiprocessor Scheduling Algorithm for Creating Near-Optimal Schedules Using Task System Graphs", ACM, 1992.

Prasanna, G.N., et al., "Generalized Multiprocessor Scheduling for Directed Acylic Graphs", IEEE, 1994.

Kwok, Y. et al., "Static Scheduling Algorithms for Allocating Directed Task Graphs to Multiprocessors", ACM, Dec. 1999.

Talla, Deependra, "Architectural Techniques to Accelerate Multimedia Applications on General-Purpose Processors," Dissertation, The University of Texas at Austin, Aug. 2001, pp. 94-125.

Wulf, William A., "Evaluation of the WM Architecture," Abstract, 1992, Computer Science Department, University of Virginia, pp. 382-390.

Lam, Monica, "Software Pipelining: An Effective Scheduling Technique for VLIW Machines," Abstract, Department of Computer Science, Carnegie Mellon University, Pennsylvania, pp. 318-328.

Lee, Tsing-Fa, et al., "A Transformation-Based Method for Loop Folding," IEEE Transactions on Computer-Aided Design of Integrated Circuits and Systems, vol. 13, No. 4, Apr. 1994, pp. 439-450.

Aiken, Alexander et al., "Resource-Constrained Software Pipelining," IEEE Transactions on Parallel and Distributed Systems, vol. 6, No. 12, Dec. 1995, pp. 1248-1270.

Kavi, Krishna et al., "A Formal Definition of Data Flow Graph Models," IEEE Transactions on Computers, vol. C-35, No. 11, Nov. 1986, pp. 940-948.

Cooper, Keith et al., "Efficient Computation of Flow Insensitive Interprocedural Summary Information," Proceedings of the ACM SIGPLAN 1984 Symposium on Compiler Construction, SIGPLAN Notices vol. 19, No. 6, Jun. 1984, pp. 247-258.

Strong, H.R., "Vector Execution of Flow Graphs," IBM Research Laboratory, San Jose, California, Journal of the Association for Computing Machinery, vol. 30, No. 1, Jan. 1983, pp. 186-196.

* cited by examiner

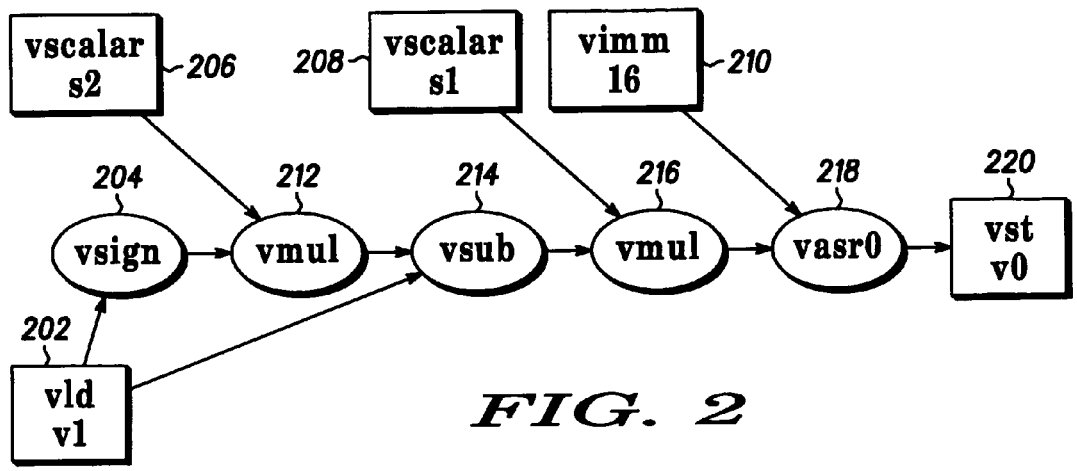
FIG. 2
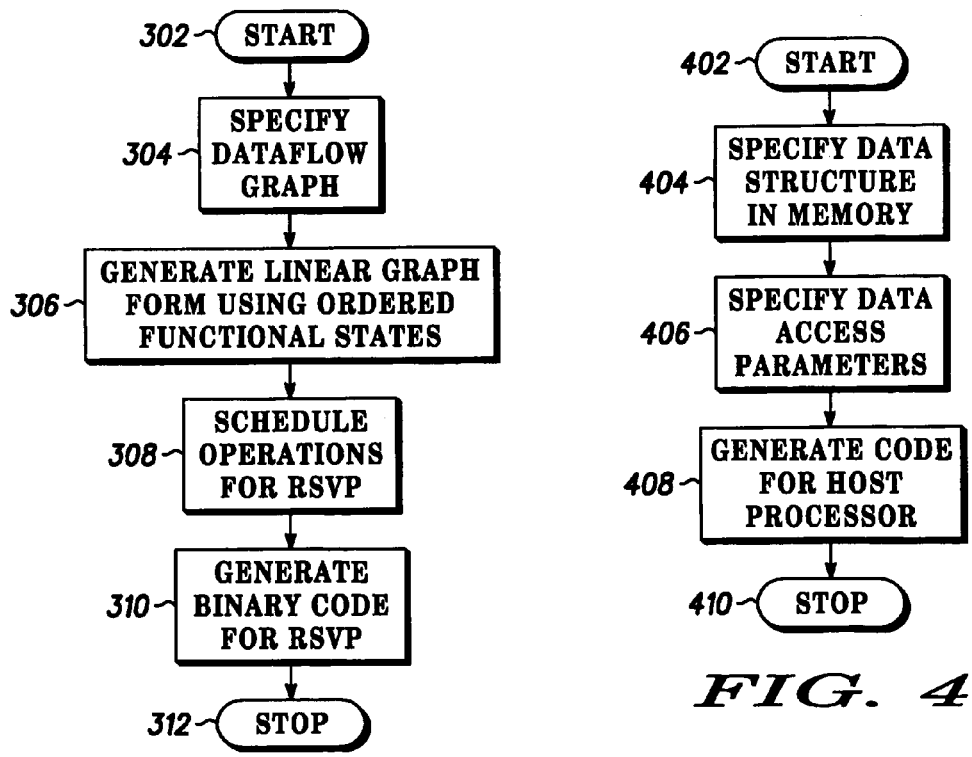
FIG. 3
FIG. 4

STREAMING VECTOR PROCESSOR WITH RECONFIGURABLE INTERCONNECTION SWITCH

CROSS REFERENCE TO RELATED APPLICATIONS

This application is related to co-pending patent applications titled "INTERCONNECTION DEVICE WITH INTEGRATED STORAGE" and identified by Ser. No. 10/184,609, "MEMORY INTERFACE WITH FRACTIONAL ADDRESSING" and identified by Ser. No. 10/184,582, "SCHEDULER FOR STREAMING VECTOR PROCESSOR" and identified by Ser. No. 10/184,772, "METHOD OF PROGRAMMING LINEAR GRAPHS FOR STREAMING VECTOR COMPUTATION" and identified by Ser. No. 10/184,743, which are filed on even day herewith and are hereby incorporated herein by reference.

FIELD OF THE INVENTION

This invention relates generally to the field of computer processors. More particularly, this invention relates to a re-configurable, streaming vector processor.

BACKGROUND OF THE INVENTION

Many new applications being planned for mobile devices (multimedia, graphics, image compression/decompression, etc.) involve a high percentage of streaming vector computations. The computation rate of these applications often exceeds that which the best general purpose CPU's can deliver. Therefore, it is desirable to find a means to improve the performance of the computation engine present in such devices to meet the computational requirements of these new applications.

Simultaneously, the nature of these new applications is that the standards and the best algorithms for complying with the standards are constantly changing, requiring a solution that is programmable and easy to program. Moreover, time to market pressures are increasing. One method for addressing this issue is to increase the reuse of previous investments in software and hardware. Reuse of hardware across multiple products is best promoted through programmability. Reuse of software is promoted through the use of a consistent programming model across multiple implementations of a device so that binary compatibility is maintained.

One attempt to satisfy this need is the use of hardware accelerators. These fall short of solving the problem because they have limited reprogramming capability. Those hardware accelerators that are not fixed in function allow only for changes in the parameters of the functions they execute rather than a change in the type or ordering of functions.

Programmable solutions exist in the form of vector processors, digital signal processors, SIMD processors and VLIW processors. These solutions fall short due to limitations in their programming models which cause them to be difficult to program and make it difficult to maintain a consistent programming model across all generations of hardware. Limitations in their programming models include: programmer visibility of the data-path pipeline, memory width and latency, data alignment in memory, and explicit resource dependencies.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 2 is a data-flow graph of an exemplary iterative computation.

FIG. 3 is a flow chart of a process for programming the vector processor of the present invention.

FIG. 4 is a flow chart of a process of programming a host processor to operate with the vector processor of the present invention.

DETAILED DESCRIPTION OF THE INVENTION

Figure 1:
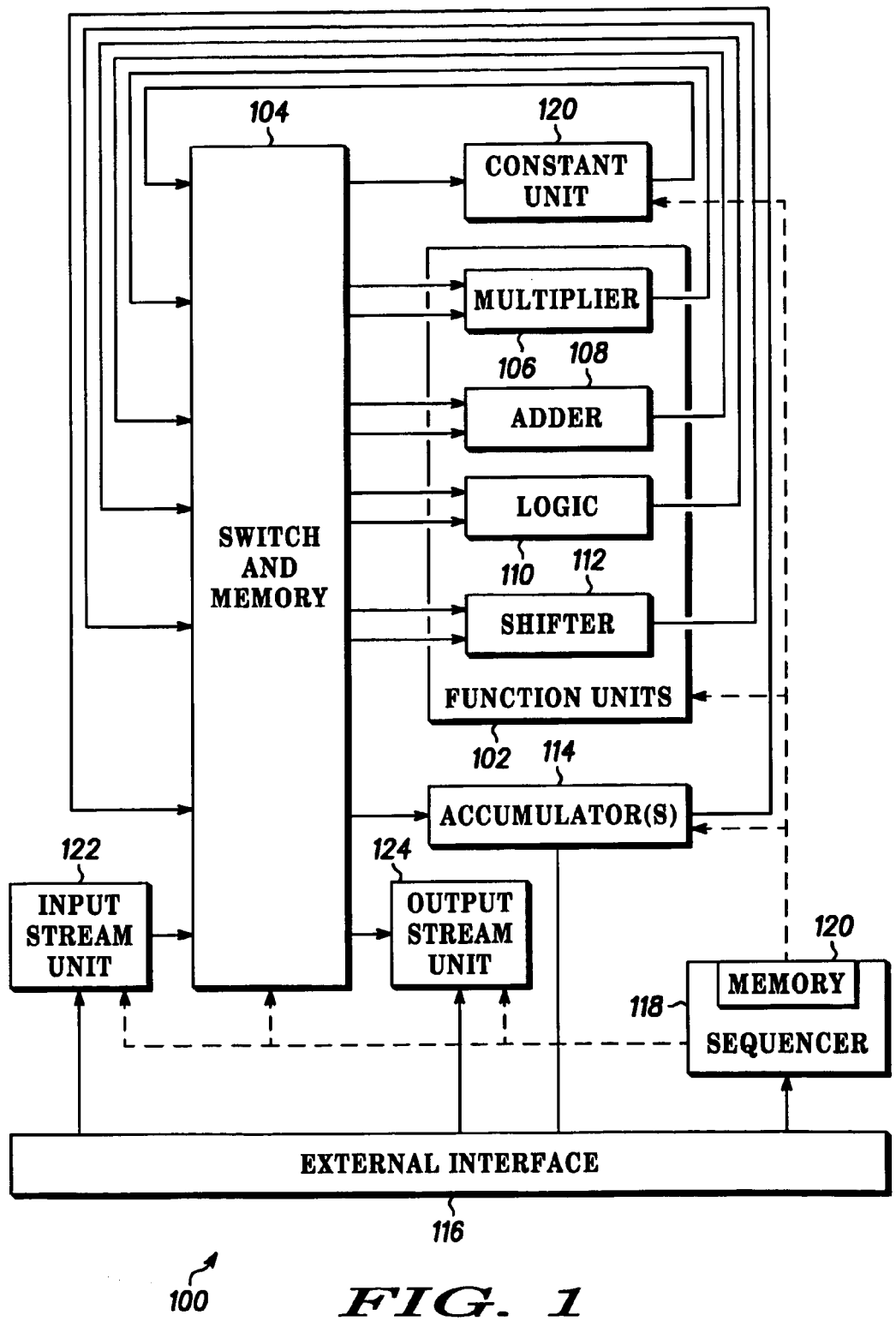
FIG. 1 is a diagrammatic representation of an embodiment of a re-configurable streaming vector processor of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The Re-configurable Streaming Vector Processor (RSVP) of the present invention is a coprocessor that performs vector operations—i.e. a set of identical operations on a sequence of data elements. It is designed to enhance the performance of an embedded general-purpose processor (the host processor) by performing high speed vector operations. In the RSVP programming model, the specification of the vector operation is split into two components: access and computation.

In one embodiment of the invention, a re-configurable, streaming vector processor is provided which includes a number of function units, each having one or more inputs for receiving data values and an output for providing a data value, a re-configurable interconnection-switch and a micro-sequencer. The re-configurable interconnection-switch includes one or more links, each link operable to couple an output of a function unit to an input of a function unit as directed by the micro-sequencer. The vector processor also includes one or more input-stream units for retrieving data from memory. The input-stream units are directed by a host processor and have a defined interface to the host processor. The vector processor also includes one or more output-stream units for writing data to memory, also with a defined interface to the host processor.

In a further embodiment, the re-configurable interconnection-switch includes a memory for storing intermediate data values.

In the preferred embodiment, the defined interface of the input-stream unit forms a first part of the programming model. The instructions, which are stored in a memory in the sequence that directs the re-configurable interconnection-switch, form a second part of the programming model.

An exemplary embodiment of RVSP hardware 100 is shown in FIG. 1. Referring to FIG. 1, the outputs and inputs of a number of function units 102 are interconnected via a re-configurable interconnection switch 104. The function units may include a multiplier 106, an adder 108, a logic unit 110 and a shifter 112. Other function units may be included, and multiple function units of a particular type may be included. The outputs from the function units may be single registers or pipeline registers. The function units may support multiple independent operations. For example, the multiplier may have a 128-bit input and a 128-bit output and be able to perform two 32×32 to 64 or four 16×16 to 32-bit multiplies, or any combination whose aggregate does not exceed 128 bits in or 128 bits out. The hardware also includes one or more accumulators 114. In the preferred embodiment, the accumulators act as both accumulators and storage registers, and are interfaced both to the interconnection switch 104 and to an external interface 116. The external interface 116 enables the RSVP to link with a host processor and allows the host processor to access the accumulators and other parts of the RSVP. The function units 102 and the re-configurable interconnection switch 104 define the data-path for the RSVP. The function units and the re-configurable interconnection switch 104 are linked to a micro-sequencer 118 that includes a memory 120, preferably a cache, for storing a program of instructions that describes the implementation specific description of a data-flow graph of the desired vector computation. At each cycle of the processor clock, the micro-sequencer produces control words that configure the links in the interconnection switch and drive the function units. Storage and presentation of scalar values and tunnel node functionality is provided by constant unit 120. The scalar values and tunnel initialization values may be loaded by the host processor or by the program of instructions. In operation, input data values are provided to the interconnection switch 104 by one or more input-stream units 122 (only one unit is shown the figure). Each input-stream unit 122 is controlled by a set of parameters describing the allocation of data in memory. This set of parameters is provided by the host processor, to which the input-stream unit is connected via external interface 116. Each output-stream unit 124 (only one unit is shown the figure) is similarly controlled by the host processor and is operable to transfer data from the re-configurable interconnection switch 104 to external memory. The input-stream unit 122 and the output-stream unit 124 are linked to the micro-sequencer 118 that synchronizes data flow.

The architecture of the exemplary RSVP described above facilitates a separation of the operations of vector access and vector computation.

Vector access, performed by an input or output stream unit, consists of describing the location, shape, and type of each input and output vector that is part of the vector operation. In the preferred embodiment, these properties are described through two or more of the parameters:

1. Vector address—the starting address in memory of the next vector element.
2. Stride—the signed increment from one element to the next.
3. Span—the number of strides before skipping.
4. Skip—the signed increment after counting a span of elements
5. Size—the size of each data element (e.g. 1, 2 or 4 bytes).

In addition to the input and output vectors, the vector processor may include a number of scalar and accumulator registers whose initial values may be specified by the programmer. These registers are used within the vector computation. In the case of the accumulators, the values of the registers are allowed to change during the computation and may be accessed for later use. The vector access portion of the programming model is described in the programming language used for the host processor and is executed on the host.

Vector computation consists of the partially ordered set of operators to be applied to the elements of the input vectors, scalar registers, and accumulators to derive each output vector element. In the programming model of the present invention, this is done via a linearized representation of a data-flow graph of the computation. In a data-flow graph, each node in the graph is denoted using a node descriptor that specifies the operation to be performed by the node and the nodes from which its input data are obtained. There is no explicit naming of registers to pass data between operators as in other CPU's. An example computation has the C language description:

void quant (short *out, short *in, int n, short qp)

```
{
    long rq, b, c;
        rq = ((1 << 16) + qp) / (qp << 1);
        b = qp - !(qp & 1);
        while(- -n > 0)
        {
            c = *in++;
            if(c < 0) c += b;
            else if(c > 0) c -= b;
            *out++ = (c * rq) / (1 <<16 );
        }
}
```

A corresponding data-flow graph is shown in FIG. 2. Referring to FIG. 2, a vector v1 is loaded at block 202. The sign of the vector is taken at node 204. The scalar values s2 and s1 are loaded at blocks 206 and 208, respectively. The immediate shift value 16 is load at block 210. At node 212 the vector v1 is multiplied by the scalar s2. The result of this multiplication is subtracted from v1 at node 214. The result of the subtraction is multiplied by the scalar s1 at node 216 and then right-shifted by 16 at node 218. The final vector result is stored as v0 at block 220.

A linearized form of the data flow graph is given by:

| Q1: | vld.s16 | (v1) | // c = *in++; |
|---|---|---|---|
| Q2: | vsign.s16 | Q1 | |
| Q3: | vscalar | s2 | // s2 is b |
| Q4: | vscalar | s1 | // s1 is rq |
| Q5: | vimm | 16 | |
| Q6: | vmul.s16 | Q2, Q3 | // if(c<0) c+=b; |
| Q7: | vsub.s16 | Q1, Q6 | // else if (c>0) c-=b; |
| Q8: | vmul.s32 | Q7, Q4 | // c *= rq; |
| Q9: | vasr0.s16 | Q8, Q5 | // *out++ = c/(1<<16); |

This exemplary linearized flow form uses the functional operations:

vld.s16—load the next data element from of vector of 16-bit data values vsign.s16—calculate the sign of the data value vscalar—load a scalar value vmul.s16—multiply two 16-bit data values vmul.s32—multiply two 32-data values vsub.s16—subtract two 16-bit data values vasr0.s16—arithmetic shift right of a 16-bit data values The function unit preferably performs a variety of other functional operations including vector element addition (vadd) and accumulation (vadda). Prior to execution, the linearized graph is scheduled onto the RSVP data path. The data path is re-configurable in each clock cycle. The function units may be aggregated, that is subsets of them can be combined to form larger function units. The function unit interconnection allows for arbitrary pipelining of the function units.

The RSVP promotes the goals of high performance and quick time to market through its programming model. Since it is a coprocessor, the RSVP preferably uses a single-core programming model. Dual-core solutions, such as that used in general purpose CPU/DSP combinations, tend to be much more difficult to program. This is because with these types of solutions, the programmer must employ two different sets of programming tools and must explicitly deal with the synchronization between the CPU and DSP.

Within the programming model of the present invention, the vector access description is separate from the vector computation description. Thus, the programmer does not have to deal with intermingling of the two concerns. Because the vector access is described only in terms of five parameters, the programmer may avoid dealing with issues of data alignment and padding, memory bus width or memory latency. The underlying vector access hardware handles these issues. In this way, the vector access description remains constant, no matter the implementation of the memory subsystem or vector access hardware. Not only does this simplify the programmer's task, but it also promotes binary code compatibility in that the RSVP binary code does not have to be altered to reflect changes in those implementations.

The vector computation description, being in the form of a data-flow graph, contains no information specific to the implementation of the RSVP data path. Excepting use of accumulators and vector stream units (VSUs), the RSVP is free of any resource dependencies. In particular, it lacks the explicit naming of registers to pass data between operators. This removes the burden from the scheduler, making it easier for the scheduler to achieve an optimum schedule. As a result, the data path can change from a scalar data path, to one that is super-scalar, VLIW or SIMD-like, transparent to the programmer and without a change in the RSVP binary code.

The separation of the vector access description and the vector computation description in the programming model is illustrated in FIG. 3 and FIG. 4. FIG. 3 shows a flow chart of the method for generating code for the RSVP. Following start block 302, a dataflow graph of the computation is specified at block 304. From the dataflow graph a linear graph form of the computation is generated at block 306. The generation of the linear graph form may be performed either manually or automatically by a computer program. In one embodiment, the computer program provides a graphical user interface to the user, facilitating the entry of the dataflow graph. The linear graph form generated at block 306 is supplied to a scheduler at block 308. The scheduler is a computer program that orders the functional operations for efficient use of the RSVP resources. Once the scheduling is complete, binary code for the RSVP is generated at block 310 and the process terminates at block 312. Notice that this process does not take account of vector access issues such as data alignment and padding, memory bus width or memory latency. These issues are dealt with by the hardware. The data access is specified in the host processor. The programming process for the host processor is shown in FIG. 4.

Referring to FIG. 4, following start block 402, the structure of the data in memory is specified at block 404. At block 406, the associated data access parameters (starting address, stride, span, skip and size) are specified. These parameters will be passed to the input-streaming unit of the RSVP during operation. At block 408, the remainder of the host processor code is generated and the process terminates at block 410. Hence, the host process specifies vector access, but is independent from vector computation.

The RSVP hardware takes advantage of several aspects of the programming model in order to improve performance. Due to the separation of vector access and computation, the hardware for each operates asynchronously with respect to the other. As a result, the vector access hardware can proceed ahead of the computation, fetching data before it is needed and thus hiding at least a portion of the memory latency.

The vector access description is succinct enough that all information is held in a small number of registers in the access hardware. These registers are accessible to the host processor. Likewise, RSVP data flow graphs are architecturally limited to a fixed number of nodes (256, for example), such that the RSVP micro-sequencer memory is large enough to hold the entire linearized form of the data flow graph. The advantage of this approach is that the hardware never needs to fetch instructions to determine how to perform the address calculations or the vector computation. This eliminates instruction fetch from the memory bandwidth required to service the RSVP computation.

Since the vector computation is specified as a data flow graph, containing few resource dependencies, the RSVP data path is unlike the data path of other CPUs. Most DSP, SIMD, VLIW and vector processor devices are unable to connect the function units of their data path in an arbitrary order. None have function units that may be aggregated.

Figure 5:
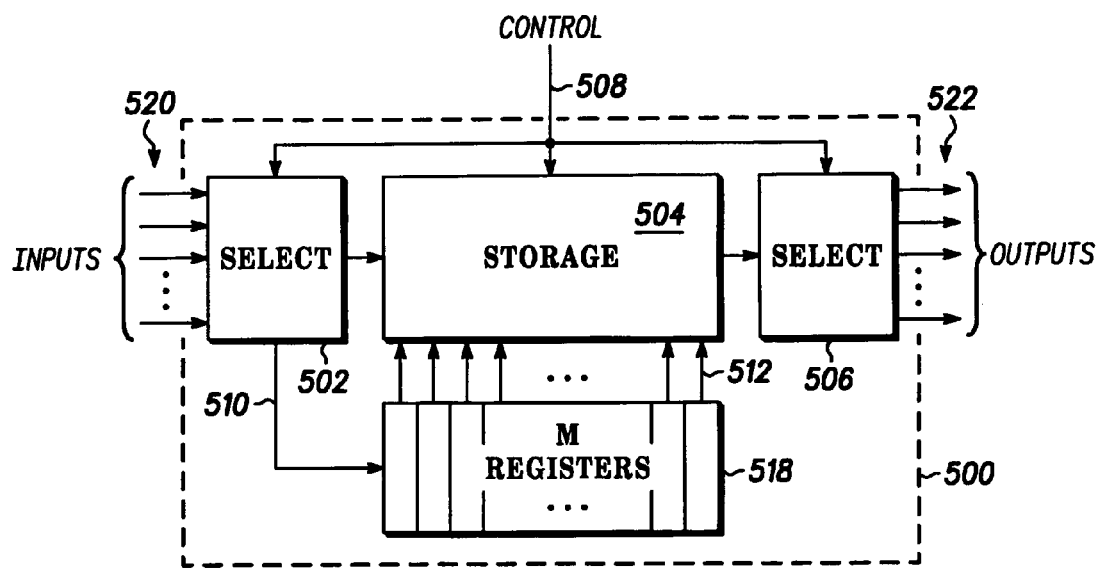
FIG. 5 is a block diagram showing the composition of a link of an exemplary interconnection switch.

The composition of a link of an exemplary interconnection switch is shown in FIG. 5. Referring to FIG. 5, the link 500 comprises an input selection switch 502, a storage access switch 504, an output selection switch 506 and a set of M storage registers 518. The input selection switch 502 receives link input signals 520 from the function unit outputs. The output selection switch is operable to provide link output signals 522 to the inputs of the function units. The link 500 receives a control signal 508 that is used to control the switches 502, 504 and 506. At the input selection switch 502, one of the link inputs 500 is selected. The link inputs are coupled to all of the interconnection switch inputs or to a subset of the interconnection switch inputs. In the preferred embodiment, the data token from the selected input port is pushed into the storage registers 518 if a non-zero delay is received, otherwise the input data token is coupled through the storage access switch 504 to the output selection switch 506. If the input data token is to be stored, it is pushed into the link storage registers via connection 510, displacing the token that has been stored for the longest time. Hence the link storage registers acts like a shift register or queue. In one embodiment, 15 registers are used in each link.

In a further embodiment, the storage access switch 504 and the output selection switch 506 are combined into a single switch.

The output data token may be selected to be the data token received at the selected link input port. Preferably, the link storage register 518 allows random access, with each register having a connection 512 to the interconnection switch. In this case the output data token may be the data token that was pushed into the storage registers a specified number of pushes previously. The delay portion of the control signal 508 is used to control the storage access switch 504. If the delay is zero, input data token is coupled through the storage access switch 504 to the output selection switch 506. Otherwise, the appropriate data token from the link storage registers is coupled through the storage access switch 504 to the output selection switch 506. The outputs are coupled to all of the interconnection switch outputs or to a subset of the interconnection switch outputs.

If one link is coupled only to a subset of the device inputs, one or more other links are provided that are coupled to the remainder of the device inputs. The control signal 508 also includes a destination address that controls the output selection switch 506 to select a link output port. In this manner, any input to the link can be routed to any link output. Also, any input can be "pushed" into the link memory (store operation). The route and push can occur simultaneously. Alternatively, the fabric link can be used to "get" a stored value and route it to any of the link outputs. The mechanism for getting a value is to specify the number of stores in the past the value was pushed. This completes the Push/Get(n) storage model. In this implementation, a 'get' operation and a 'route' operation may not be performed simultaneously. In further, the operations may be performed simultaneously.

The possible actions that can take place in the link are:
1. Route on input to one output.
2. Store one input in the link storage registers
3. Retrieve a data token from the link storage register.
4. Route with delay (i.e. store the input and retrieve a value from the storage and route it).

The combination of unnamed storage and communication-link based storage is advantageous because its architecture parallels that of the data-flow graph, simplifying the programming, compiling and scheduling models. Further, in the preferred embodiment, the number of links is less than the sum of the number of inputs and the number of outputs. Thereby reducing the amount of hardware required.

Each link may be coupled to all of the inputs or to a subset of the inputs to the communication fabric. Similarly, each link may be coupled to all of the outputs of the interconnection switch or to a subset of the outputs. Optionally, each output may be coupled to latch to facilitate storage of the output data tokens prior to use by attached computational units.

In one embodiment, the control signal comprises a source address, a delay and a destination address. TABLE 1 describes the actions taken by the link in response to some example control signals.

TABLE 1

| SOURCE | DELAY | DESTINATION | ACTION |
|---|---|---|---|
| k | m | n | push a token on link source port k into queue, route queue location m to link output port n. |
| k | 0 | n | route link input port k to link output port n |
| k | — | 0 | push link input port k into queue |
| 0 | m | n | get queue location m and route to link output port n |
| 0 | 0 | 0 | do nothing |

When used in conjunction with a number of computational units, such as adders, multipliers, shifters, logic unit etc., the interconnection switch provides a re-configurable data-path that facilitates the implementation of computations described by data-flow graphs.

Those of ordinary skill in the art will recognize that the present invention has been described in terms of exemplary embodiments based upon the use of a particular architecture. However, the invention should not be so limited, since the present invention could be implemented using equivalent architectures. It will be further understood by those skilled in the art that various changes in form and detail may be made therein without departing from the spirit and scope of the invention.

While the invention has been described in conjunction with specific embodiments, it is evident that many alternatives, modifications, permutations and variations will become apparent to those of ordinary skill in the art in light of the foregoing description. Accordingly, the present invention is intended to embrace all such alternatives, modifications and variations as fall within the scope of the appended claims.

What is claimed is:

1. A re-configurable, streaming vector processor comprising:
a plurality of function units, each comprising one of a shifter, an adder;
a logic unit and a multiplier and having one or more inputs for receiving
a data value and an output for storing a data value;
a re-configurable interconnection switch comprising a plurality of links, each link comprising an input switch operable to select between the outputs of at least two of the plurality of function units and an output switch operable to select between the inputs of at least two of the plurality of function units and each link operable to form a datapath between an output of a function unit and an input of the one or more inputs of a function unit; and
a micro-sequencer coupled to the re-configurable interconnection switch and operable to control the re-configurable interconnection switch,
wherein the micro-sequencer is operable to produce one or more control words that cause a data value stored at the output of a function unit to traverse, in a single cycle of a processor clock, the datapath formed by a link of the plurality of links.

2. A re-configurable, streaming vector processor in accordance with claim 1, wherein the mico-sequencer includes a program memory for storing a program of instructions.

3. A re-configurable, streaming vector processor in accordance with claim 1, wherein the re-configurable interconnection switch includes a switch memory for storing data values.

4. A re-configurable, streaming vector processor in accordance with claim 3, wherein the switch memory comprises at least one of a FIFO, a programmed delay and a plurality of registers configured to form a data pipeline.

5. A re-configurable, streaming vector processor in accordance with claim 1, wherein a link of the re-configurable interconnection switch is directed by the micro-sequencer to receive a data value from an output of a function unit and to provide a data value to an input of the one or more inputs of a function unit.

6. A re-configurable, streaming vector processor in accordance with claim 1, further comprising:
one or more input stream units coupled to the re-configurable interconnection switch and operable, in response to a single control instruction, to retrieve a plurality of input data values from a data memory and to provide the plurality of input data values to the re-configurable interconnection switch; and
one or more output stream units coupled to the output of the re-configurable interconnection switch and operable to receive data values from the re-configurable interconnection switch and to provide output data values to a data memory.

7. A re-configutable, streaming vector processor in accordance with claim 6, wherein the input and output stream units include an interface for receiving control instructions from a host computer.

8. A re-configurable, streaming vector processor in accordance with claim 7, wherein the control instructions comprises at least one of:
   a starting address of a vector of data values in the data memory;
   a span of the vector of data values;
   a stride between data values;
   a number of memory addresses to skip between a span of vector data values; and
   a size of each data value in the vector of data values.

9. A re-configurable, streaming vector processor in accordance with claim 6, further comprising an external interface operable to couple to the input stream units, the output stream units and the micro-sequencer to a host computer.

10. A re-configurable, streaming vector processor in accordance with claim 1, wherein the function units further comprise a passthrough function unit.

11. A re-configurable, streaming vector processor in accordance with claim 1, wherein an output of at least one of the plurality of function units comprises a pipeline of registers.

12. A re-configurable, streaming vector processor in accordance with claim 1, further comprising at least one accumulator coupled to the re-configurable interconnection switch.

13. A re-configurable, streaming vector processor in accordance with claim 12, wherein the at least one accumulator is operable to be coupled to a host computer.

14. A re-configurable, streaming vector processor in accordance with claim 1, further comprising a plurality of scaler registers.

15. A re-configurable, streaming vector processor in accordance with claim 14, wherein the plurality of scaler registers provide a data tunnel.

16. A method for operating a streaming vector processor comprising an interconnection switch having a plurality of links, a micro-sequencer and a plurality of function units each having an output and one or more inputs, the method comprising:
   storing a program of instructions in the micro-sequencer;
   in a single instruction cycle of the streaming vector processor;
      retrieving an instruction of the program of instructions;
      configuring the interconnection switch in accordance with the instruction retrieved from the program of instructions to provide a datapath between the output of a first function unit of the plurality of function units and an input of the one or more inputs of a second function unit of the plurality of function units;
      moving a first data value stored at the output the first function unit to the input of the second function unit along the datapath;
      the second function unit operating on the first data value to produce a second data value; and
      storing the second data value at the output of the second function unit,
   wherein configuring the interconnection switch in accordance with the instruction retrieved from the program of instructions comprises:
      configuring an input switch of a link of the plurality of links to select the output of the first function unit; and
      configuring an output switch of the link to select an input of the second function unit.

17. A method in accordance with claim 16, wherein the streaming vector processor further comprises one or more input stream units having a buffer memory and wherein the method further comprises:
   configuring the interconnection switch in accordance the instruction retrieved from the program of instructions to provide a direct datapath along a link of the interconnection switch between an input stream unit of the one or more input stream units and an input of the one or more inputs of a second function unit of the plurality of function units.

18. A method in accordance with claim 17, the method further comprising each input stream unit retrieving data values from an external memory and storing them in the buffer memory of the input stream unit in accordance with a set parameters received from a host processor.

19. A method in accordance with claim 16, wherein the streaming vector processor further comprises one or more output stream units having a buffer memory and wherein the method further comprises:
   configuring the interconnection switch in accordance the instruction retrieved from the program of instructions to provide a direct datapath along a link of the interconnection switch between the output of a first function unit of the plurality of function units and an output stream unit of the one or more output stream units.

20. A method in accordance with claim 19, further comprising each output stream unit writing data values from the buffer memory of the output stream unit to an external memory in accordance with a set parameters received from a host processor.

* * * * *